United States Patent
Matsuyama et al.

(10) Patent No.: US 7,793,399 B2
(45) Date of Patent: Sep. 14, 2010

(54) METHOD FOR REMOVING A CRACK IN AN ELECTROMECHANICAL ROTOR

(75) Inventors: Koji Matsuyama, Yokohama (JP); Hideki Chiba, Yokohama (JP); Hiromichi Ito, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 151 days.

(21) Appl. No.: 11/806,113

(22) Filed: May 30, 2007

(65) Prior Publication Data
US 2007/0277366 A1    Dec. 6, 2007

(30) Foreign Application Priority Data
May 31, 2006    (JP)    ............................ P2006-152505

(51) Int. Cl.
*B23P 19/04*    (2006.01)

(52) U.S. Cl. .............. 29/402.08; 29/402.05; 29/402.07; 29/402.13; 29/598; 29/889.1; 310/216.001; 310/261.1

(58) Field of Classification Search ........... 29/596–598, 29/402.05, 402.07, 402.08, 402.13, 889.1; 310/216, 261, 270, 216.001
See application file for complete search history.

(56) References Cited

U.S. PATENT DOCUMENTS

| 5,043,616 | A  | * | 8/1991 | Katsuzawa et al. ............ 310/91 |
| 6,615,470 | B2 | * | 9/2003 | Corderman et al. ...... 29/402.13 |
| 6,849,972 | B1 |   | 2/2005 | Barnes et al. |

FOREIGN PATENT DOCUMENTS

| JP | 4-29304  | 5/1992  |
| JP | 5-74304  | 10/1993 |
| JP | 7-40774  | 5/1995  |
| JP | 7-44802  | 5/1995  |

\* cited by examiner

*Primary Examiner*—Thiem Phan
(74) *Attorney, Agent, or Firm*—Finnegan, Henderson, Farabow, Garrett & Dunner, L.L.P.

(57) ABSTRACT

In a method for removing a crack in an electromechanical rotor, a through-hole penetrating from a side of one of slots adjacent to each other via a rotor core portion to a side of the other slot is formed to include a crack in the rotor core portion occurring to a contact surface with a wedge, in an electromechanical rotor including a plurality of slots formed in an axial direction in an outer peripheral surface of the rotor core portion, a coil housed in the slot, a wedge inserted in an upper portion of the slot to be arranged in the axial direction and holding the coil in the slot, and the crack is removed.

12 Claims, 6 Drawing Sheets

METHOD FOR REMOVING A CRACK IN AN ELECTROMECHANICAL ROTOR

CROSS-REFERENCE TO RELATED APPLICATIONS

This application is based upon and claims the benefit of priority from the prior Japanese Patent Application No. 2006-152505, filed on May 31, 2006; the entire contents of which are incorporated herein by reference.

BACKGROUND

1. Field of the Invention

The present invention relates to a method for removing a crack in an electromechanical rotor in which a number of slots are provided in an axial direction in an outer peripheral surface of a rotor core portion, a coil and a plurality of wedges are respectively inserted in lower portions and upper portions in the slots, and the coil is fixed in the slots by the wedges, a method for preventing crack growth in the same, an electromechanical rotor and a rotary electrical machine.

2. Description of the Related Art

As an example of the conventional electromechanical rotor, the construction of a turbine generator rotor 300 will be described with reference to FIGS. 7 to 13.

FIG. 7 is a view schematically showing a section of a part of the conventional turbine generator rotor 300, and FIG. 8 is a view schematically showing a surface perpendicular to the axial direction of the turbine generator rotor 300 shown in FIG. 7 with a part of it as a section. FIG. 9 is a perspective view schematically showing the assembly state of a slot 303 and a wedge 305 in FIG. 8. FIG. 10 is a plane view showing a deformed rotor shaft 301. FIG. 11 is a perspective view showing the turbine generator rotor 300 having a crack in a rotor dovetail portion. FIGS. 12 and 13 are perspective views of the turbine generator rotor 300 for explaining the conventional method for removing a crack occurring to the rotor dovetail portion.

As shown in FIGS. 7 to 9, the turbine generator rotor 300 includes a rotor core portion 302 formed integrally with the rotor shaft 301, and a number of slots 303 are provided in the axial direction in the rotor core portion 302. A coil 304 is inserted into the lower portions in each of the slots, and a plurality of wedges 305 are placed on the coil 304 via an insulating block 306. The wedges 305 are placed by being inserted in an insertion groove at an upper portion in the slot 303, and prevent the coil 304 from escaping from the inside of the slot 303 by a centrifugal force caused by rotation of the rotor shaft 301.

The wedge 305 may be formed into each of various shapes, but is generally formed into a dovetail shape as shown in FIG. 9, and is sometimes formed into a shape such as a T-shape, a Christmas tree shape or the like. Since a plurality of wedges 305 are inserted into the slot 303, a contact end portion 308 where the end surfaces of the wedges 305 adjacent to each other is formed on a contact surface 307 of the wedge 305 and the slot 303. On the contact end portion 308, not only the contact pressure by the centrifugal force concentrates, but also a relative slip ±δ occurs between the slot 303 (rotor core portion 302) and the wedge 305 when the rotor core portion 302 is bent with a curvature r by the tare weight or bending vibration and rotates as shown in FIG. 10. Therefore, large tensile and compression stress concentrates on the contact end portion 308 at the side of the rotor core portion 302 in the slipping direction. Therefore, a fretting damage occurs to this portion and a crack due to fatigue sometimes occurs.

When the radius of the rotor core portion 302 is set as ro, and the length of the wedge 305 is set as L as shown in FIG. 10, the rotor core portion 302 extends and contracts by δ shown in the following formula (1) at the position corresponding to the wedge end portion when it reaches the upper point A and the lower point B, but the wedge 305 is divided in the longitudinal direction, and therefore, does not extend or contract. Accordingly, a relative slip 2δ is caused at the contact end portion 308 of the wedge 305 and the rotor core portion 302 at each rotation of the rotor shaft 301.

$$\delta = ro \cdot L/2r \quad \text{formula (1)}$$

As described above, the contact pressure concentrates on the contact end portion 308, and when the contact surface at high contact pressure is accompanied with slip, a crack 309 as shown in FIG. 11 sometimes occurs to the contact surface 307 at the side of the rotor core portion 302 due to a fretting damage.

Further, the crack 309 which occurs to the contact surface 307 at the side of the rotor core portion 302 is likely to grow due to bending stress occurring when the rotor core portion 302 performs bending rotation with the curvature r by the tare weight or bending vibration, thermal stress due to the temperature difference between the outside diameter side and the inside diameter side of the rotor core portion 302 at the time of operation of the turbine generator, residual stress of the material and the like. Therefore, for example, U.S. Pat. No. 6,849,972 discloses the art of removing the crack 309 which occurs to the contact surface 307 at the side of the rotor core portion 302 at the time of regular inspection or the like.

In the conventional crack removing method, the periphery of the crack occurring to the contact surface 307 of the rotor core portion 302 is notched and removed in accordance with the occurrence state, the size of the crack and the like, and a crack removed portion 310 is formed as shown in FIGS. 12 and 13.

Further, JP-B2 HEI 4-29304 (KOKOKU) discloses the art of providing a groove for relieving stress concentration on the contact end portion 308 at the side of the rotor core portion 302, and relieving concentration of the tensile and compression stress in the slipping direction on the contact end portion due to relative slip of the wedge 305 and the rotor core portion 302. Further, JP-B2 HEI 5-74304 (KOKOKU), JP-B2 HEI 7-40774 (KOKOKU) and JP-B2 HEI 7-44802 (KOKOKU) also disclose the art of reducing and preventing fretting fatigue of the contact surface 307 at the side of the rotor core portion 302.

The above described conventional art of removing the crack 309 occurring to the contact surface 307 at the side of the rotor core portion 302 requires a machining operation of a narrow portion inside the slot 303, and has the disadvantage of being unfavorable in workability. Further, the conventional art of relieving concentration of the tensile and compression stress in the slipping direction on the contact end portion due to relative slip of the wedge 305 and the rotor core portion 302, and the art of reducing and preventing the fretting fatigue of the contact surface 307 at the side of the rotor core portion 302 are the arts of preventing occurrence of a crack due to fretting fatigue, and are not the arts of removing a crack which occurs, or preventing crack growth.

SUMMARY OF THE INVENTION

The present invention has an object to provide a method for removing a crack in an electromechanical rotor which can easily remove a crack occurring to a contact surface of a wedge at a side of a rotor core portion, a method for preventing crack growth in the electromechanical rotor which can prevent growth of a crack which occurs, an electromechanical rotor in which a crack is removed by the method for removing a crack in an electromechanical rotor or the method for preventing crack growth in the electromechanical rotor, and a rotary electrical machine including the electromechanical rotor.

According to an aspect of the present invention, there is provided a method for removing a crack in an electromechanical rotor that removes a crack in a rotor core portion which occurs to a contact surface of a slot and a wedge, in an electromechanical rotor including a plurality of slots formed in an axial direction in an outer peripheral surface of the rotor core portion, a coil housed in the slot, and a wedge which is inserted in an upper portion of the slot to be arranged in the axial direction and holds the coil in the slot, including forming a through-hole that penetrates from a side of one of slots adjacent to each other via the rotor core portion to a side of the other slot, to include the crack in the rotor core portion in which the crack is formed to remove the crack.

According to an aspect of the present invention, there is provided an electromechanical rotor wherein a crack in a rotor core portion is removed by the above described method for removing a crack in an electromechanical rotor.

According to an aspect of the present invention, there is provided a rotary electrical machine having an electromechanical rotor which a crack in a rotor core portion is removed by the above described method for removing a crack in an electromechanical rotor.

According to an aspect of the present invention, there is provided a method for preventing crack growth in an electromechanical rotor that prevents crack growth in a rotor core portion which occurs to a contact surface of a slot and a wedge, in an electromechanical rotor including a plurality of slots formed in an axial direction in an outer peripheral surface of the rotor core portion, a coil housed in the slot, and a wedge which is inserted into an upper portion of the slot to be arranged in the axial direction and holds the coil in the slot, including forming a through-hole that penetrates from a side of one of slots adjacent to each other via the rotor core portion to a side of the other slot to include at least an innermost crack portion of a crack in the rotor core portion in which the crack is formed to remove at least the innermost crack portion.

According to an aspect of the present invention, there is provided an electromechanical rotor wherein crack growth in a rotor core portion is prevented by the above described method for preventing crack growth in an electromechanical rotor.

According to an aspect of the present invention, there is provided a rotary electrical machine having an electromechanical rotor which crack growth in a rotor core portion is prevented by the above described method for preventing crack growth in an electromechanical rotor.

BRIEF DESCRIPTION OF THE DRAWINGS

Though the present invention will be described with reference to the drawings, these drawings are provided for only an illustrative purpose, and do not intend to restrict the invention in any way.

DESCRIPTION OF THE EMBODIMENTS

One embodiment of the present invention will now be described with reference to the drawings.

First Embodiment

A first embodiment of the present invention will be described with reference to FIGS. 1 to 3. In the first embodiment, a method for removing a crack in an electromechanical rotor which can easily remove a crack occurring to a contact surface of a wedge at a side of a rotor core portion will be described.

Figure 1:
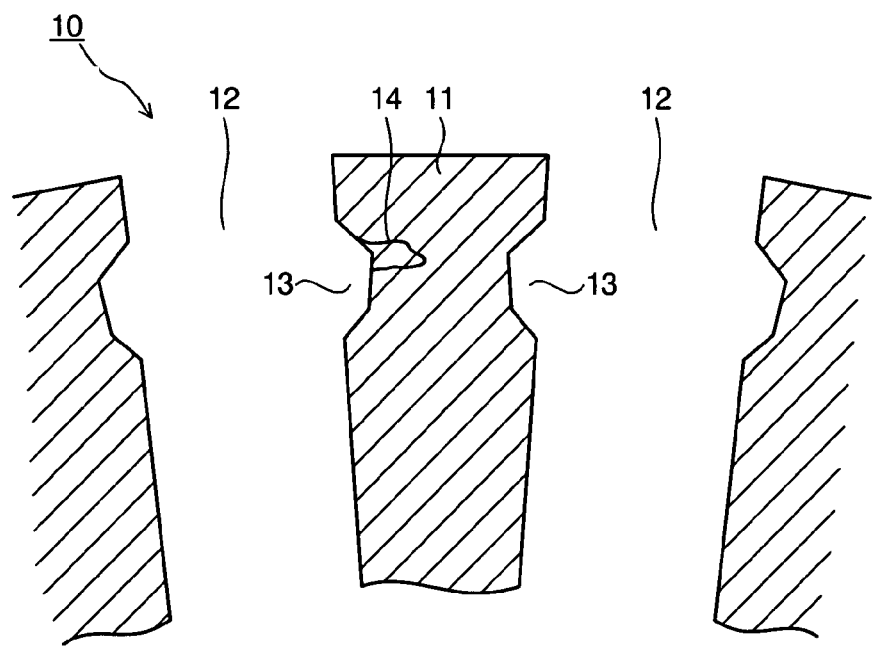
FIG. 1 is a view schematically showing a section from an axial direction of an electromechanical rotor in a rotor core portion in a state where a crack occurs.

FIG. 1 is a view schematically showing the section from an axial direction of an electromechanical rotor 10 in a rotor core portion 11 in the state where a crack 14 occurs. FIG. 2 is a view schematically showing the section from the axial direction of the electromechanical rotor 10 in the rotor core portion 11 in the state where the crack 14 is removed. FIG. 3 is a view schematically showing the section from the axial direction of the electromechanical rotor 10 in the rotor core portion 11 in the state where a filler member 25 is welded to a through-hole 20.

Figure 2:
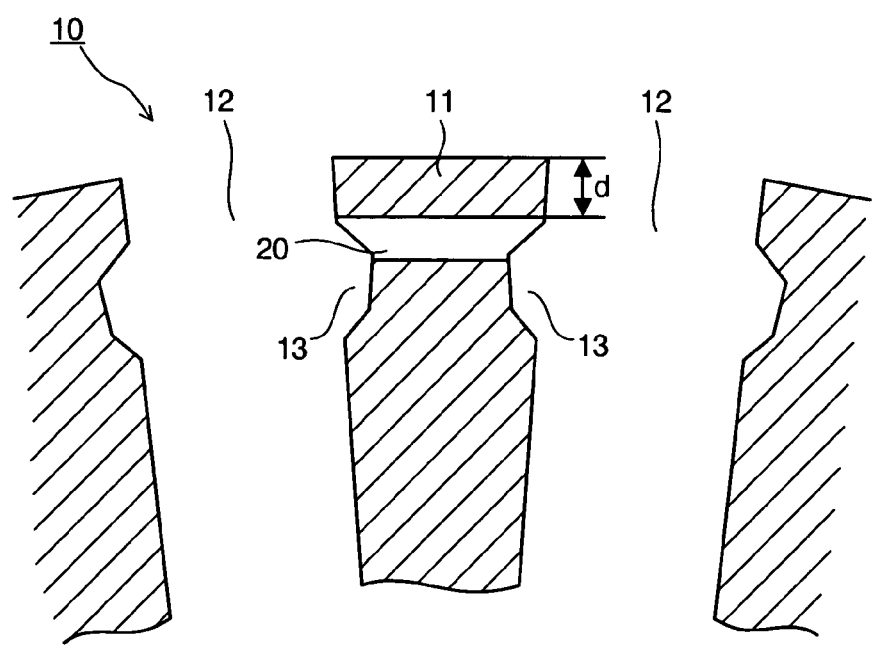
FIG. 2 is a view schematically showing the section from the axial direction of the electromechanical rotor in the rotor core portion in the state where the crack is removed.

As shown in FIGS. 1 and 2, in an outer peripheral surface of the rotor core portion 11 of the electromechanical rotor 10, a plurality of slots 12 which are provided to be recessed in a center axis direction and to extend in an axial direction are formed. Though not shown, a coil is housed in the slot 12, and wedges are inserted in the outer side in the radius direction of the coil via an insulating layer as described in the Background Art. The wedges prevent the coil from springing out in the radius direction by a centrifugal force caused by rotation of the electromechanical rotor 10, and the wedges in the shape of, for example, a dovetail, a letter of T, a Christmas tree or the like are used.

A plurality of wedges are inserted in an insertion groove 13 of the slot 12, and therefore, a contact end portion where end surfaces of the wedges adjacent to each other contact each other is formed on a contact surface of the wedge and the slot 12. As shown in FIG. 1, on the contact end portion, not only the contact pressure due to a centrifugal force concentrates, but also relative slip occurs between the slot 12 (rotor core portion 11) and the wedge when the rotor core portion 11 bends due to the tare weight or bending vibration and rotates, and fretting damage occurs to the side of the rotor core portion 11, thus sometimes causing the crack 14 due to fatigue, as described in the Background Art.

Next, the method for removing the crack 14 will be described with reference to FIG. 2.

As shown in FIG. 2, the through-hole 20 that penetrates from a side of one of the slots 12 which are adjacent to each other via the rotor core portion 11 to a side of the other slot 12 is formed to include the crack 14 of the rotor core portion 11 in which the crack 14 is formed, and the crack 14 is removed. The through-hole 20 is preferably formed to be substantially horizontal from the one slot 12 to the other slot 12.

The minimum diameter of the through-hole 20 is limited to about 3 mm due to the limit in machining of the through-hole 20. Further, the diameter of the through-hole 20 is set to be not more than 25 mm, and the remaining wall thickness d of the outer peripheral side of the rotor core portion 11 after formation of the through-hole 20 is set to be not less than 5 mm.

The upper portion of the slot 12 of the rotor core portion 11 in which the through-hole 20 is formed is under the stress environment subjected to high cycle fatigue due to bending stress occurring when the rotor core portion 11 bends and rotates with a predetermined curvature due to the tare weight or bending vibration, thermal stress due to the temperature difference between the outside diameter side and the inside diameter side of the rotor core portion 11, and the axial stress of the residual stress or the like of the material, and low cycle fatigue by the variation in the centrifugal force in the slot at the time of actuation and stoppage. In this case, it is preferable to set the diameter of the through-hole 20 at not more than 25 mm, and set the remaining wall thickness d of the outer peripheral surface side of the rotor core portion 11 after formation of the through-hole 20 at not less than 5 mm as described above. This is because fatigue strength reduces in both the aspects of the above described high-cycle fatigue strength and low-cycle fatigue strength when the diameter of the through-hole 20 is larger than 25 mm, or the remaining wall thickness d is smaller than 5 mm. Machining of the through-hole 20 can be performed by a machining tool such as a drilling machine, and by laser or the like, for example.

As described above, according to the method for removing the crack 14 formed in the rotor core portion 11 in the first embodiment, all the crack 14 can be removed by forming the through-hole 20 which penetrates from the side of one of the slots 12 adjacent to each other via the rotor core portion 11 to the side of the other slot 12 to include the crack 14 of the rotor core portion 11 in which the crack 14 is formed. Further, by forming the through-hole 20 which penetrates substantially horizontally from the side of one of the slots 12 adjacent to each other via the rotor core portion 11 in which the crack 14 is formed to the side of the other slot 12, a centrifugal force which is loaded onto the rotor core portion 11 in which the through-hole 20 is formed can be made substantially uniform at the left and the right of the rotor core portion 11, namely, at both end sides of the through-hole 20 of the rotor core portion 11. Further, the crack 14 of the rotor core portion 11 can be easily removed, and predetermined mechanical strength can be maintained even after the crack 14 is removed.

Figure 3:
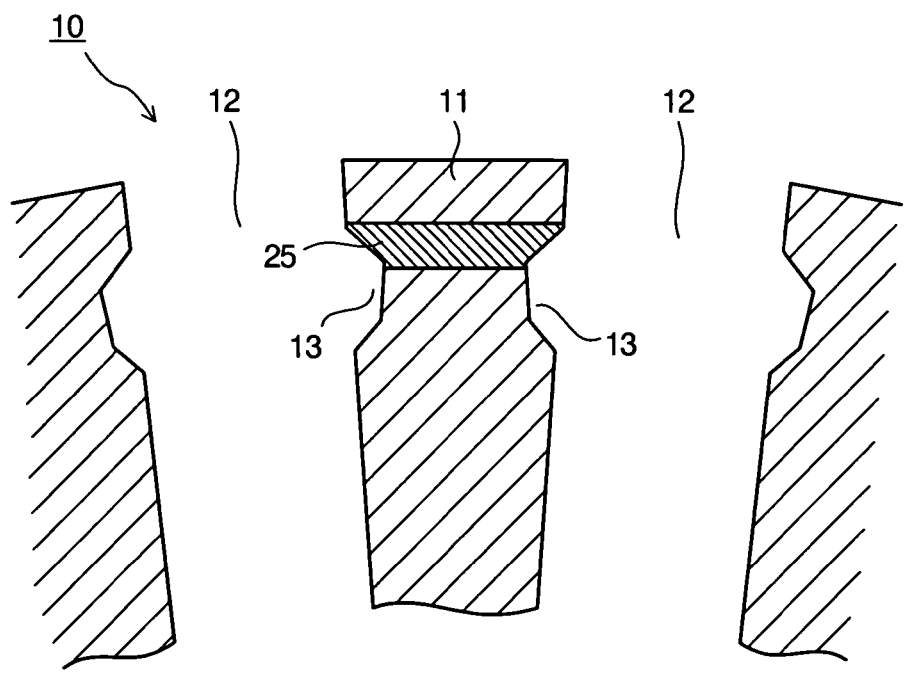
FIG. 3 is a view schematically showing the section from the axial direction of the electromechanical rotor in the rotor core portion in the state where a filler member is welded to a through-hole.

In this case, as shown in FIG. 3, the filler member 25 may be inserted into the through-hole 20 and may be joined thereto by welding. The filler member 25 which is inserted into the through-hole 20 preferably has substantially the same shape as the shape of the through-hole 20, and especially when the through-hole 20 penetrates to the side of insertion groove 13, the filler member 25 is constructed so as not to protrude to the side of the insertion groove 13. The filler member 25 is preferably constructed by the same material as the material forming the rotor core portion 11, or a material with substantially the same specific gravity as the material forming the rotor core portion 11 to keep the weight balance uniform with each of the rotor core portions 11.

Further, the method for fixing the filler member 25 to the through-hole 20 is not limited to joining of the filler member 25 to the through-hole 20 by welding as described above. For example, a female screw thread may be cut in the inner wall surface of the through-hole 20, and the filler member 25 with a male screw thread corresponding to the female screw thread formed in the side surface may be fixed by being screwed onto the female screw thread.

By filling the filler member 25 into the through-hole 20 like this, the weight balance with each of the rotor core portions 11 can be kept uniform. Further, by filling the filler member 25 into the through-hole 20, the centrifugal force equivalent to the centrifugal force loaded onto the rotor core portion 11 in which the through-hole 20 is not formed is loaded, and the load of the centrifugal force in each of the rotor core portions 11 can be kept substantially uniform.

Second Embodiment

In the method for removing the crack 14 formed in the rotor core portion 11 in the above described first embodiment, one example in which all the crack 14 formed in the rotor core portion 11 is removed is shown, but growth of a crack may be prevented by removing at least an innermost crack portion in the innermost side of the rotor core portion 11, of the crack 14 instead of removing all the crack 14, for example. Here, the innermost crack portion means an endmost portion in the radius direction of the rotor core portion 11 or an endmost portion in the circumferential direction, of the crack formed in the rotor core portion 11, that is, a region where the crack grows the most in the radius direction of the rotor core portion 11 or a region where the crack grows the most in the circumferential direction.

In a second embodiment of the present invention, a method for preventing crack growth in an electromechanical rotor which prevents growth of the crack 14 formed in the rotor core portion 11 will be described with reference to FIGS. 4 to 6. The same parts as in the construction in the first embodiment are assigned with the same reference numerals, and the redundant explanation will be simplified or omitted.

Figure 4:
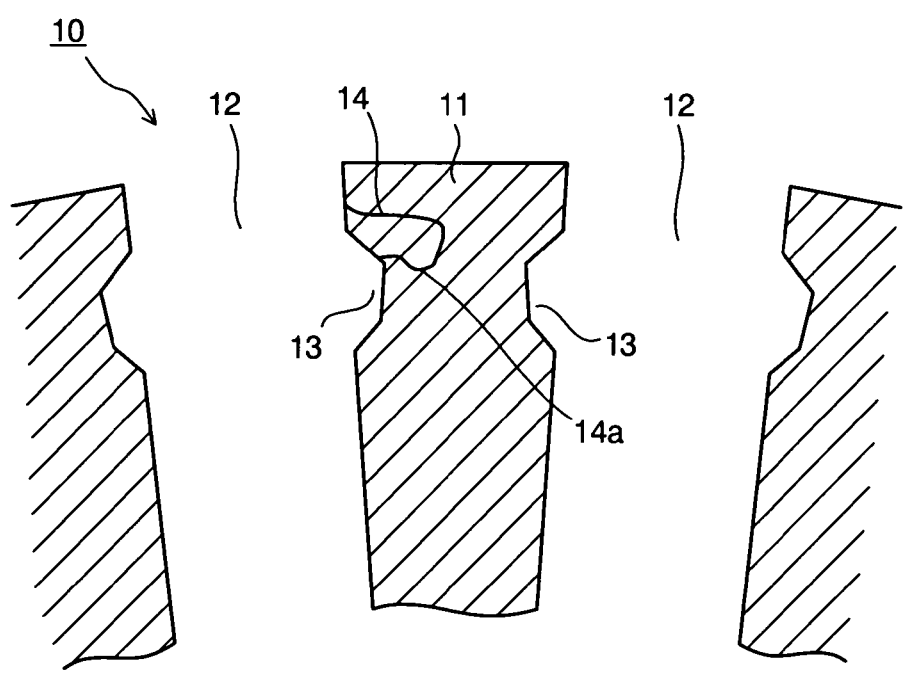
FIG. 4 is a view schematically showing the section from the axial direction of the electromechanical rotor in the rotor core portion in the state where a crack occurs.

FIG. 4 is a view schematically showing a section from the axial direction of an electromechanical rotor 10 in the rotor core portion 11 in the state where the crack 14 occurs. FIG. 5 is a view schematically showing the section from the axial direction of the electromechanical rotor 10 in the rotor core portion 11 in the state where an innermost crack portion 14a in the rotor core portion 11 is removed. FIG. 6 is a view schematically showing the section from the axial direction of the electromechanical rotor 10 in the rotor core portion 11 in the state in which the filler member 25 is welded to the through-hole 20.

The method for preventing crack growth which removes at least the innermost crack portion 14a in the rotor core portion 11 will now be described with reference to FIGS. 4 to 7.

Figure 5:
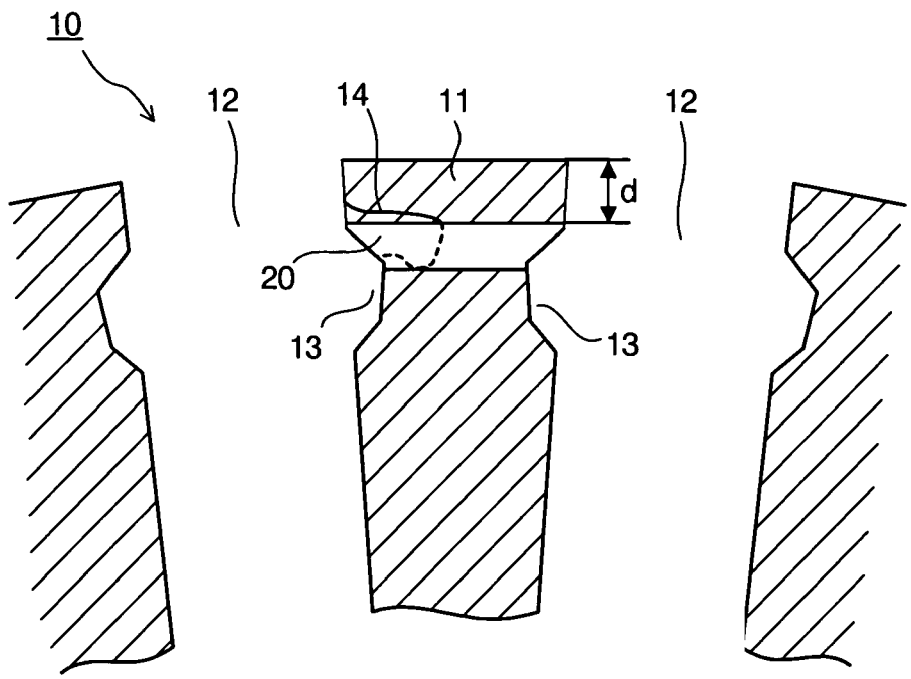
FIG. 5 is a view schematically showing the section from the axial direction of the electromechanical rotor in the rotor core portion in the state where an innermost crack portion in the rotor core portion is removed.

When the crack 14 occurs to the rotor core portion 11 (see FIG. 4), the through-hole 20 which penetrates from a side of one of the slots 12 that are adjacent to each other via the rotor core portion 11 to a side of the other slot 12 is formed to include at least the innermost crack portion 14a of the rotor core portion 11 in which the crack 14 is formed, and the innermost crack portion 14a of the crack 14 is removed as shown in FIG. 5. The through-hole 20 is preferably formed substantially horizontally from the side of the one slot 12 to the side of the other slot 12.

On forming the through-hole 20, it is preferable that the region including at least the innermost crack portion 14a can be removed, and as shown in FIG. 5, it is more preferable to construct the through-hole 20 so that the wall surface of the through-hole 20 inside the rotor core portion 11 contacts the innermost crack portion 14a, and the crack 14 at the outer side in the radius direction from the innermost crack portion 14a as well as the innermost crack portion 14a is removed. Thereby, growth of the crack 14 can be prevented, and the crack 14 can be more broadly removed.

As in the case of the through-hole 20 in the first embodiment, the minimum diameter of the through-hole 20 is limited to about 3 mm due to the limit in machining of the through-hole 20. The diameter of the through-hole 20 is set at not more than 25 mm, and the remaining wall thickness d of the rotor core portion 11 at the side of the outer peripheral surface after formation of the through-hole 20 is set at not less than 5 mm. The reason why it is preferable to set the diameter of the through-hole 20 at not more than 25 mm and set the remaining wall thickness d of the rotor core portion 11 at the side of the outer peripheral surface at not less than 5 mm is that when the diameter of the through-hole 20 is larger than 25 mm, or the remaining wall thickness d is smaller than 5 mm, fatigue strength reduces in both aspects of the above described high-cycle fatigue strength and low-cycle fatigue strength. Machining of the through-hole 20 can be performed by a machining tool such as a drilling machine, and by laser or the like, for example.

As described above, according to the method for preventing crack growth in the second embodiment, growth of the crack 14 can be prevented by removing at least the innermost crack portion 14a of the rotor core portion 11. By forming the through-hole 20 which penetrates from the side of one of the slots 12 which are adjacent to each other via the rotor core portion 11 to the side of the other slot 12 to include at least the innermost crack portion 14a of the rotor core portion 11 in which the crack 14 is formed, the centrifugal force loaded on the rotor core portion 11 in which the through-hole 20 is formed can be made substantially uniform at the left and the right of the rotor core portion 11, that is, at both end sides of the through-hole 20 of the rotor core portion 11. Further, the crack 14 of the rotor core portion 11 can be easily removed, and predetermined mechanical strength can be maintained even after the crack 14 is removed.

According to the method for preventing crack growth, for example, when the crack 14 is formed over the wide range in the radius direction of the rotor core portion 11, and all the crack 14 cannot be removed in the above described range of the diameter of the through-hole 20 and the remaining wall thickness d of the rotor core portion 11 at the side of the outer peripheral surface, the innermost crack portion 14a which accelerates crack growth is removed in the above described range of the diameter of the through-hole 20 and the remaining wall thickness d of the rotor core portion 11 at the side of the outer peripheral surface, and growth of the crack 14 can be prevented.

Figure 6:
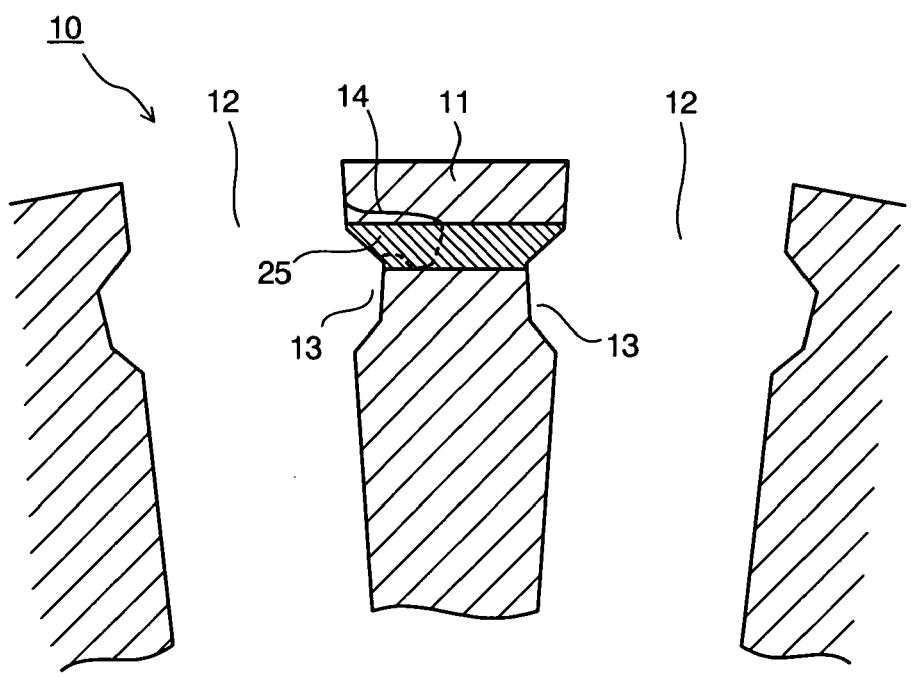
FIG. 6 is a view schematically showing the section from the axial direction of the electromechanical rotor in the rotor core portion in the state where the filler member is welded to the through-hole.
Figure 7:
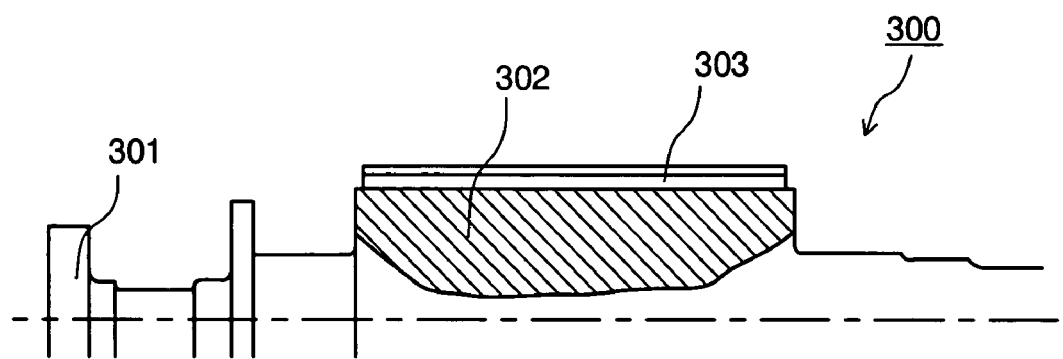
FIG. 7 is a view schematically showing a section of a part of the conventional turbine generator rotor.
Figure 8:
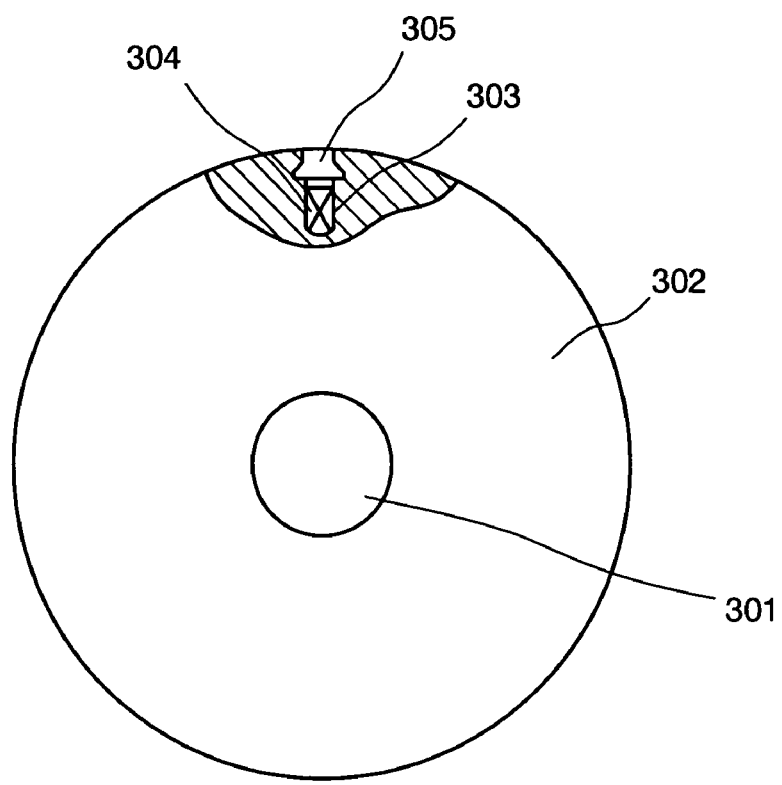
FIG. 8 is a view schematically showing a surface perpendicular to the axial direction of the turbine generator rotor shown in FIG. 7 with a part of it as a section.
Figure 9:
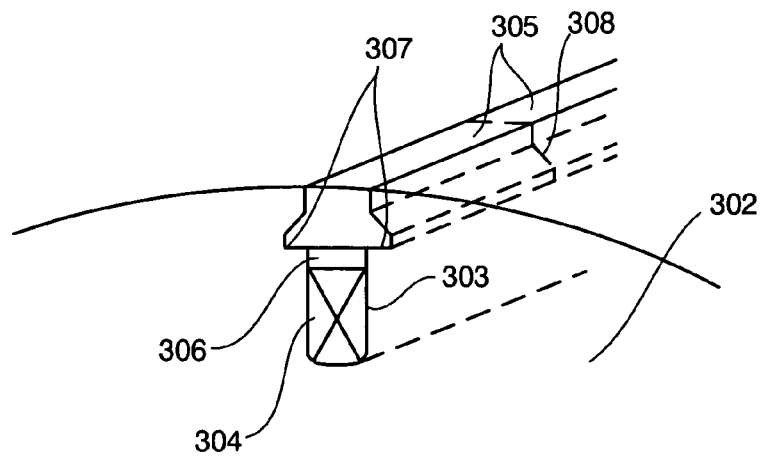
FIG. 9 is a perspective view schematically showing the assembly state of a slot and a wedge in FIG. 8.
Figure 10:
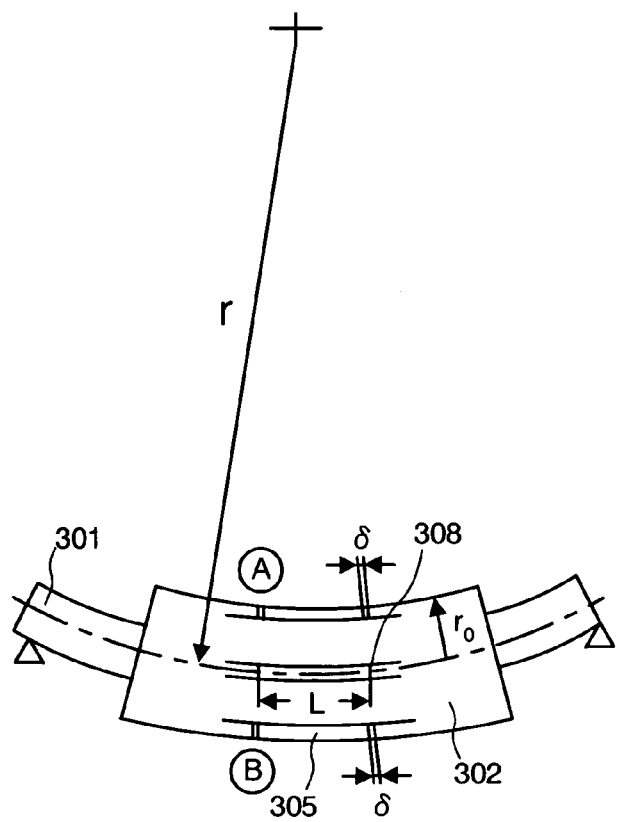
FIG. 10 is a plane view showing a deformed rotor shaft.
Figure 11:
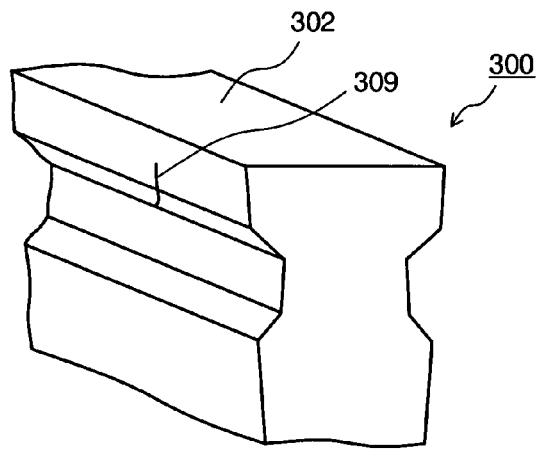
FIG. 11 is a perspective view showing a turbine generator rotor having a crack in a rotor dovetail portion.
Figure 12:
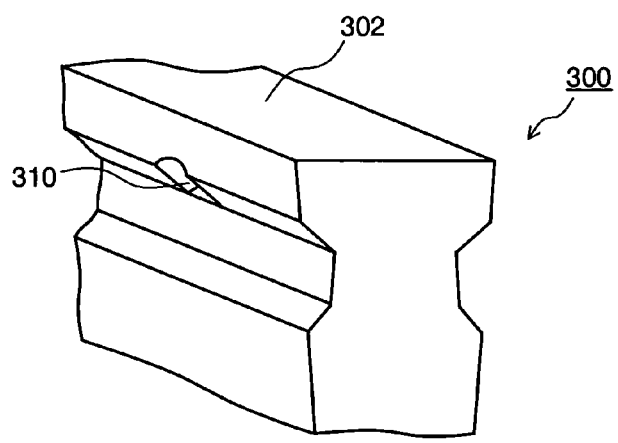
FIG. 12 is a perspective view of the turbine generator rotor for explaining the conventional method for removing a crack occurring to the rotor dovetail portion.
Figure 13:
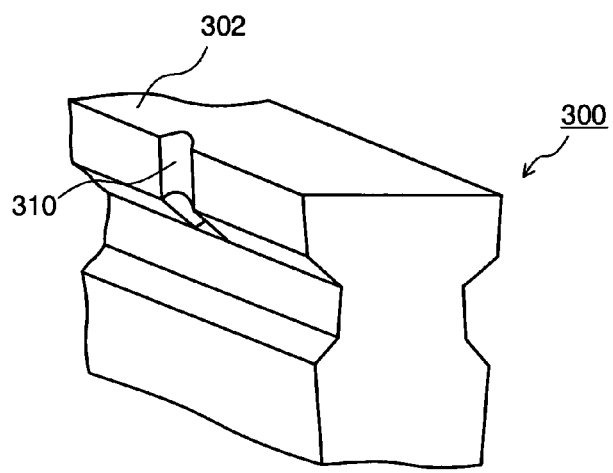
FIG. 13 is a perspective view of the turbine generator rotor for explaining the conventional method for removing a crack occurring to the rotor dovetail portion.

In this case, as shown in FIG. 6, the filler member 25 may be inserted into the through-hole 20 and may be joined thereto by welding. The filler member 25 inserted into the through-hole 20 preferably has substantially the same shape as the shape of the through-hole 20, and especially when the through-hole 20 penetrates to the side of the insertion groove 13, the filler member 25 is constructed so as not to protrude to the side of the insertion groove 13. The filler member 25 is preferably constructed by the same material as the material forming the rotor core portion 11, or a material with substantially the same specific gravity as the material forming the rotor core portion 11 to keep the weight balance uniform with each of the rotor core portions 11.

Further, the method for fixing the filler member 25 to the through-hole 20 is not limited to joining of the filler member 25 to the through-hole 20 by welding as described above. For example, the filler member 25 may be fixed by cutting a female screw thread in the inner wall surface of the through-hole 20, and by screwing the filler member 25 having a male screw thread corresponding to the female screw thread formed on the side surface, onto the female screw thread.

By filling the filler member 25 into the through-hole 20 like this, the weight balance with each of the rotor core portions 11 can be kept uniform. Further, by filling the filler member 25 into the through-hole 20, the centrifugal force equivalent to the centrifugal force loaded on the rotor core portion 11 in which the through-hole 20 is not formed is loaded, and the load of the centrifugal force in each of the rotor core portions 11 can be kept substantially uniform.

The present invention is more concretely described based on the first and the second embodiments thus far. The present invention is not limited to only these embodiments, and various changes can be made therein without departing from the spirit of the present invention. Further, the present invention can be applied to all rotary electrical machines such as electric motors and generators.

What is claimed is:

1. A method for removing a crack in an electromechanical rotor, comprising:
   providing an electromechanical rotor, the electromechanical rotor having:
      a rotor core portion,
      a plurality of slots formed on an outer surface of the rotor core portion along an axial direction of the electromechanical rotor, at least one of the slots being configured to receive a coil, and
      a groove formed on both side walls of the at least one slot, the groove being configured to hold a wedge for maintaining the coil in the respective slot,
      the rotor core portion including a crack developed from a contact surface between the wedge and the respective slot, the crack extending along a circumferential direction; and
   forming a through-hole that penetrates the rotor core portion between the side walls of the adjacent slots respectively across the crack to remove the crack.

2. The method for removing a crack in an electromechanical rotor according to claim 1,
   wherein a filler member is inserted into the through-hole, and the filler member is fixed by being welded to the rotor core portion.

3. The method for removing a crack in an electromechanical rotor according to claim 2,
   wherein the filler member is formed from the same material as a material forming the rotor core portion, or a material having the same specific gravity as the material forming the rotor core portion.

4. The method for removing a crack in an electromechanical rotor according to claim 1,
wherein a female screw thread is cut in an inner wall surface of the through-hole, and the filler member with a male screw thread corresponding to the female screw thread formed in a side surface is fixed by being screwed onto the female screw thread.

5. The method for removing a crack in an electromechanical rotor according to claim 4,
wherein the filler member is formed from the same material as a material forming the rotor core portion, or a material having the same specific gravity as the material forming the rotor core portion.

6. The method for removing a crack in an electromechanical rotor according to claim 1, wherein the through-hole is located a predetermined distance from the outer surface of the rotor core portion.

7. A method for preventing crack growth in an electromechanical rotor, comprising:
providing an electromechanical rotor, the electromechanical rotor having:
a rotor core portion,
a plurality of slots formed on an outer surface of the rotor core portion along an axial direction of the electromechanical rotor, at least one of the slots being configured to receive a coil, and
a groove formed on both side walls of the at least one slot, the groove being configured to hold a wedge for maintaining the coil in the respective slot,
the rotor core portion including a crack developed from a contact surface between the wedge and the respective slot, the crack extending along a circumferential direction; and
forming a through-hole that penetrates the rotor core portion between the side walls of the adjacent slots respectively across the crack to remove at least an innermost crack portion of the crack in the rotor core portion.

8. The method for preventing crack growth in an electromechanical rotor according to claim 7,
wherein a filler member is inserted into the through-hole, and the filler member is fixed by being welded to the rotor core portion.

9. The method for preventing crack growth in an electromechanical rotor according to claim 8,
wherein the filler member is formed from the same material as a material forming the rotor core portion, or a material having the same specific gravity as the material forming the rotor core portion.

10. The method for preventing crack growth in an electromechanical rotor according to claim 7,
wherein a female screw thread is cut in an inner wall surface of the through-hole, and the filler member with a male screw thread corresponding to the female screw thread formed in a side surface is fixed by being screwed onto the female screw thread.

11. The method for preventing crack growth in an electromechanical rotor according to claim 10,
wherein the filler member is formed from the same material as a material forming the rotor core portion, or a material having the same specific gravity as the material forming the rotor core portion.

12. The method for preventing crack growth in an electromechanical rotor according to claim 7, wherein the through-hole is located a predetermined distance from the outer surface of the rotor core portion.

* * * * *